UNITED STATES PATENT OFFICE.

RUDOLF ALBERTI, OF MAGDEBURG, GERMANY.

PIGMENT.

SPECIFICATION forming part of Letters Patent No. 578,383, dated March 9, 1897.

Application filed July 31, 1895. Serial No. 557,743. (No specimens.) Patented in Germany July 6, 1894, No. 80,751; in England February 6, 1895, No. 2,636, and in Austria March 8, 1895, No. 45/812.

*To all whom it may concern:*

Be it known that I, RUDOLF ALBERTI, a subject of the King of Prussia, Emperor of Germany, residing at Magdeburg, in the Kingdom of Prussia, German Empire, have invented certain new and useful Improvements in Pigments and the Process of Manufacturing the Same, (the same being the subject-matter of Letters Patent in Germany, No. 80,751, dated July 6, 1894; in Austria, No. 45/812, dated March 8, 1895, and in Great Britain, No. 2,636, dated February 6, 1895,) of which the following is a specification.

This invention has for its object to produce an improved rapidly-drying paint of good body, specially applicable as a substitute for white lead, zinc-white, and the like, and to provide a new process of manufacturing the same.

In carrying out the invention any suitable quantity of ground sulfate of zinc ($ZnSO_4 + 7H_2O$) is thoroughly mixed with an equivalent quantity of calcium carbonate, ($CaCO_3$,) calcium oxid, (CaO,) or barium carbonate, ($BaCO_3$,) and this mixture is exposed to heat in a suitable furnace for several hours until decomposition takes place. The whole mass shortly dissolves in its water of crystallization, whereby an extremely fine subdivision and mixture of the substances takes place. The heat being now increased, the mixed mass swells or boils up, while the water of crystallization evaporates, and when the heating is continued the mass is all, or nearly all, decomposed into oxid of zinc (ZnO) and sulfate of calcium, ($CaSO_4$,) respectively, or when barium carbonate ($BaCO_3$) is used into oxid of zinc (ZnO) and sulfate of barium, ($BaSO_4$,) while the carbonic acid is volatilized and escapes. The following are the reactions respectively for the three first-mentioned compounds:

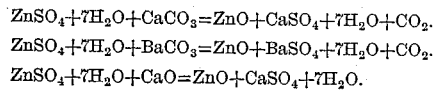

$ZnSO_4 + 7H_2O + CaCO_3 = ZnO + CaSO_4 + 7H_2O + CO_2$.
$ZnSO_4 + 7H_2O + BaCO_3 = ZnO + BaSO_4 + 7H_2O + CO_2$.
$ZnSO_4 + 7H_2O + CaO = ZnO + CaSO_4 + 7H_2O$.

This decomposition of the two substances takes place at a considerably lower temperature when the substances are mixed (as hereinbefore described) than when the substances are each of them heated separately; that is to say, sulfate of zinc alone, calcium carbonate alone, and barium carbonate alone require for their decomposition into oxid of zinc and sulfuric acid, or into carbonic acid and oxid of calcium, or into carbonic acid and oxid of barium, respectively, a very much higher temperature than is necessary for the decomposition of a mixture of these substances. For the decomposition of the greatest part of this mixture it is sufficient to heat it over an ordinary good Bunsen burner for some time at a red heat, or at a less heat, say 300° to 400° centigrade, until the decomposition takes place, while at the same temperature the decomposition of sulfate of zinc alone and of calcium carbonate alone only takes place to a small extent, and the decomposition of barium carbonate does not take place at all. The same results are obtained if the substances be heated in a common heating-furnace instead of on a Bunsen burner, while the decomposition of the barium carbonate alone only takes place by heating it in a specially-constructed furnace to a temperature four or six times higher than that employed in a common heating-furnace.

The heating of the mixture in the furnace is preferably continued until only a small quantity of undecomposed sulfate of zinc, calcium carbonate, or barium carbonate is still present, as thereby the drying quality of the paint is very greatly improved.

After cooling the mass which is obtained by this process of heating is ground, the softness of the same enabling a high degree of fineness to be obtained. The paints thus obtained (zinc anhydrid and zinc baryta) possess a good body, which is obtained by the extremely fine subdivision of the paint produced in this process as described by fusion of the mixture of the substances and the gradual decomposition at a moderate temperature. These paints also possess excellent drying qualities in consequence of the small quantity of undecomposed sulfate of zinc finely distributed over the whole mass. These paints are an excellent substitute for lead and zinc paints and are of a greater technical importance than the lead and zinc paints hitherto known. If made from pure raw materials, they may be used as white or yellowish-white paints, and if made from less pure materials they may be used alone or mixed with other colors as good oil-paints, more particularly as rapidly-drying ground or floor paints.

What I claim is—

1. An improved process for the manufacture of paint pigment consisting in heating a mixture of sulfate of zinc and calcium carbonate (or calcium oxid, or barium carbonate) gradually to a moderate temperature until decomposition takes place and the resulting volatile matter is almost entirely volatilized, and in afterward grinding the substance thus produced substantially as hereinbefore described.

2. The improved process of manufacturing paint pigment from calcium carbonate, calcium oxid, barium carbonate and like compounds, which process consists in adding sulfate of zinc to such compounds, melting the mass under heat, forming zinc oxid, decomposing most of the zinc sulfate in the mass, continuing the heat until substantially all volatile matter is driven off, cooling the resulting product, and reducing it to a powder.

In witness whereof I have hereunto signed my name in the presence of two subscribing witnesses.

RUDOLF ALBERTI.

Witnesses:
  ERNST KOHLE,
  WILLI EGGELING.